United States Patent

Turner et al.

[11] 3,880,186
[45] Apr. 29, 1975

[54] FLOW CONTROL DEVICES

[75] Inventors: Jess H. Turner, Riverside; Elmer E. Wallace, Fullerton; Claud C. Hurd, Riverside, all of Calif.

[73] Assignee: Essex International Inc., Fort Wayne, Ind.

[22] Filed: Mar. 25, 1974

[21] Appl. No.: 454,131

[52] U.S. Cl. .................. 137/495; 251/29; 251/30
[51] Int. Cl. .................... F16k 17/10; F16k 31/145
[58] Field of Search ...... 137/495, 499, 489, 614.17, 137/468, 627.5; 138/44, 46; 236/48, 80, 68 R; 251/29, 61, 61.1, 48, 30, 138

[56] References Cited
UNITED STATES PATENTS

| | | | |
|---|---|---|---|
| 3,304,002 | 2/1967 | Grayson | 137/489 |
| 3,351,085 | 11/1967 | Allingham | 137/489 X |
| 3,502,101 | 3/1970 | Willson et al. | 137/495 |
| 3,552,430 | 1/1971 | Love | 137/495 |
| 3,685,732 | 8/1972 | Haskins | 137/495 X |
| 3,796,229 | 3/1974 | Wright | 137/495 |

*Primary Examiner*—Martin P. Schwadron
*Assistant Examiner*—Robert J. Miller
*Attorney, Agent, or Firm*—Robert D. Sommer; Lawrence E. Freiburger

[57] ABSTRACT

Control Devices for controlling the flow of fuel to a gas burner. In a first embodiment of the invention a main valve is operated by a bleed controlled diaphragm. An electromagnetic operator operates an on-off bleed valve and an orifice bleed valve. The orifice bleed valve includes an operating stem surrounded by a valve collar through which an aperture extends. When the electromagnetic operator is deenergized, the on-off bleed valve is closed and a leaf spring is prevented from urging the orifice bleed valve collar against a corresponding valve seat, assuring full bleed flow to the operating chamber and maintaining the main valve in a closed position. When the electromagnetic operator is energized, the leaf spring is allowed to urge the orifice bleed valve collar against its corresponding valve seat and the on-off bleed valve is opened. Bleed gas is then supplied through the restricted aperture in the orifice bleed valve collar and is bled off to a servo regulator by the on-off bleed valve, reducing the operating chamber pressure, allowing the main valve to open and regulating the outlet pressure.

A second embodiment of the invention provides a step flow to the burner which is pressure regulated on both low and high flow states. The first opening step is controlled in the same manner as the first embodiment of the invention. The second opening step, however, is provided by a second electromagnetic operated valve which, when opened, places the low pressure servo regulator and a high pressure servo regulator in parallel. When the servo regulators are connected in parallel, the high pressure regulator is dominant in regulating the outlet pressure.

16 Claims, 3 Drawing Figures

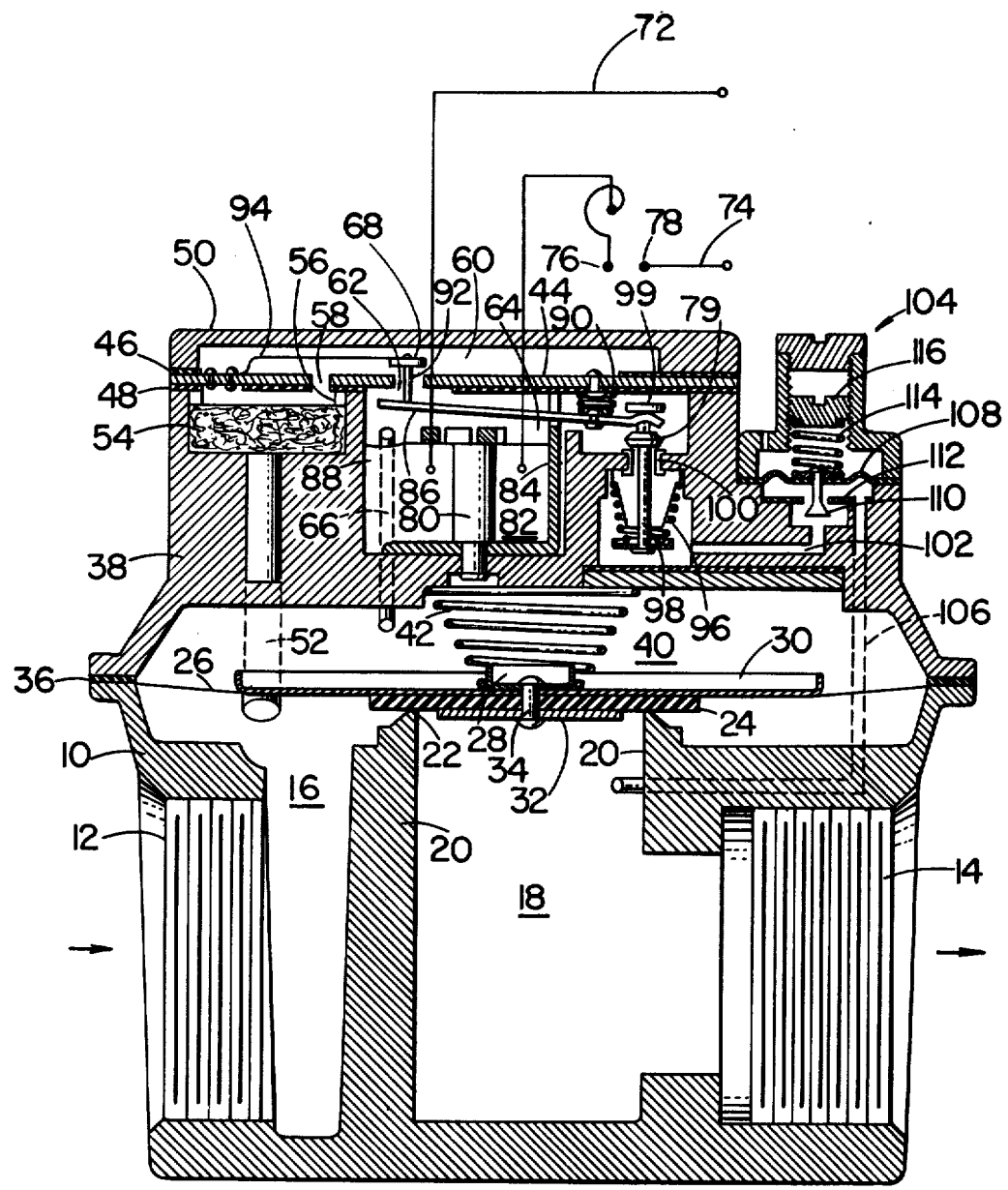

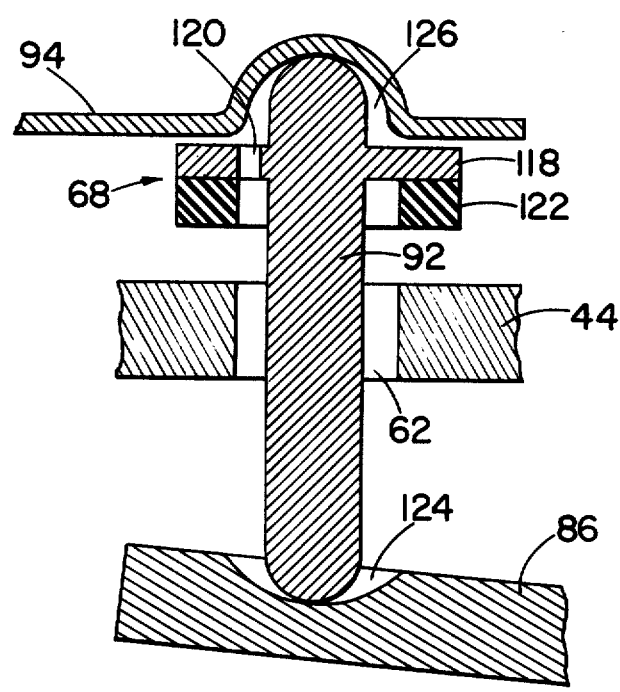

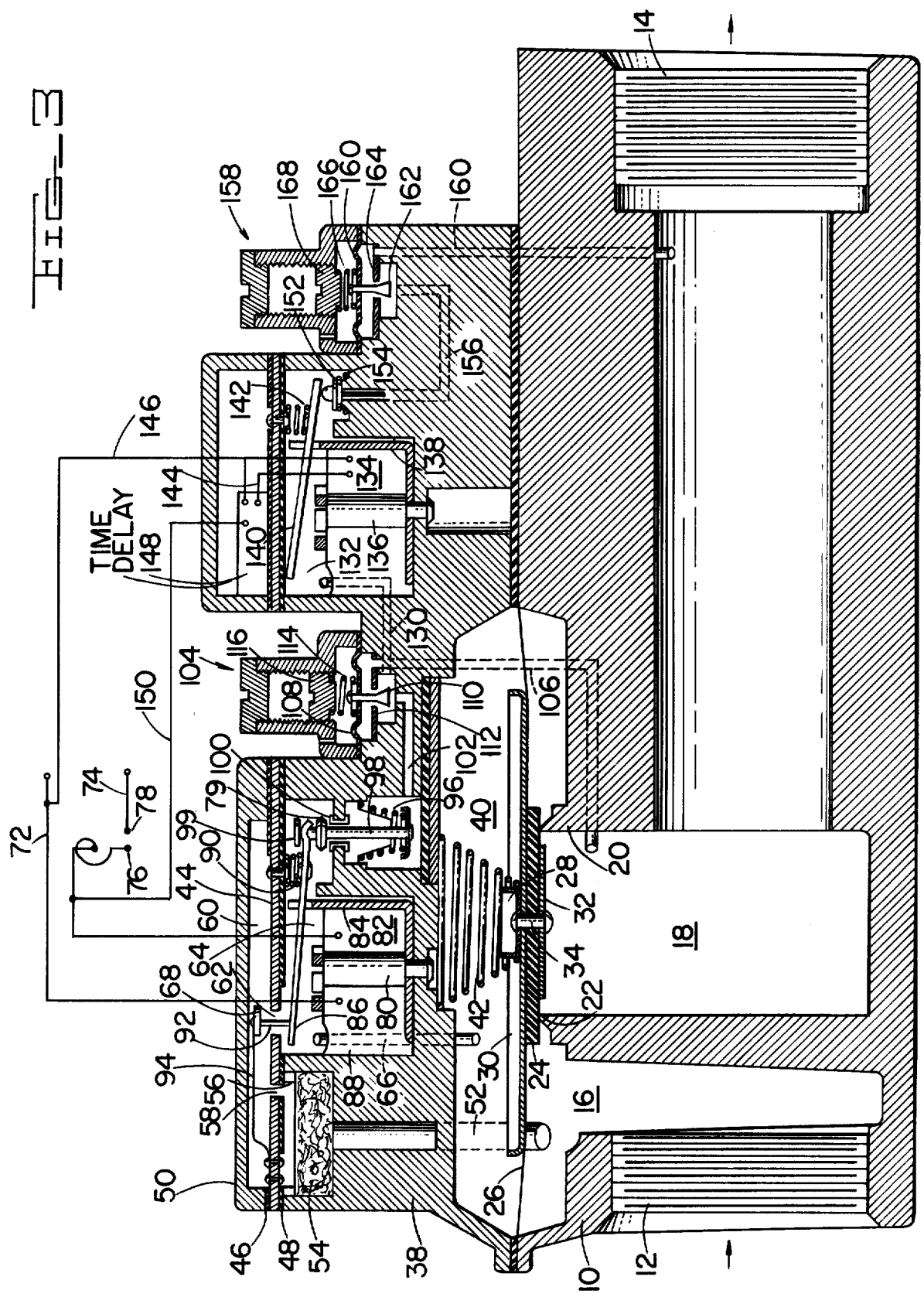

FLOW CONTROL DEVICES

BACKGROUND OF THE INVENTION

This invention pertains to a flow control device for controlling and regulating the pressure of a fuel supplied to a gas burner and, more particularly, to improvements in bleed type servo regulated diaphragm operated gas valves.

For years, the workhorse of the heating industry has been the bleed type servo regulated diaphragm operated gas valve. The present invention is related to specific improvement in this basic gas valve. These improvements are aimed at providing a more efficient, economical and safe gas valve.

In the prior art it is known to provide a gas valve with an electromagnetically controlled bleed system. Such a device is shown in U.S. Pat. No. 3,513,873 wherein two bleed lines, one restricted and one unrestricted, lead from the inlet to a bleed chamber. The purpose of these bleed lines is to provide a restricted flow of bleed gas to operate the main valve and an unrestricted flow of bleed gas to close the main valve rapidly.

Also, in the prior art it is known to utilize two servo regulators to regulate the outlet pressure in steps. Such a device is disclosed in U.S. Pat. No. 3,552,430 wherein servo regulators 54 and 66 regulate the outlet pressure at different levels. One of the servo regulator diaphragms doubles to also provide the time delay between the low pressure level and the high pressure level.

Although the device disclosed in U.S. Pat. No. 3,513,873 operates in a satisfactory manner, it is desirable to reduce its production cost without adversely affecting its desirable operating characteristics. Therefore, the present invention takes note of the fact that the device disclosed in U.S. Pat. No. 3,513,873 has two passageways leading from the inlet to a bleed chamber, one restricted and one unrestricted. Thus, the present invention is specifically directed at the elimination of one of these two passageways to reduce cost without sacrificing any desirable operating characteristics such as rapid closure of the main valve after thermostat opening.

The device disclosed in U.S. Pat. No. 3,552,430 relies on a restricted orifice in conjunction with a diaphragm member to provide the time delay necessary for a step opening. The orifice is controlled by a needle valve to allow adjustment of the time delay. This arrangement has the inherent problem that dust and other foreign matter can clog the restricted orifice resulting in an appreciable change in the time interval of the step opening from that which was originally desired. Thus, the present invention is directed at providing a more positive degree of control of this time interval between step openings and more particularly in providing a means by which the time interval, once adjusted, will remain the same over relatively long periods of time.

SUMMARY OF THE INVENTION

In accordance with the present invention, flow control devices are provided which improve on the performance and/or cost of the afore-mentioned devices.

The present invention thus provides a single stage control having: a diaphragm which operates a main valve and which responds to pressure differentials between the inlet and an operating or control chamber, a bleed system which acts to maintain the pressure on both sides of the diaphragm substantially equal when an electromagnetic operator is deenergized and which reduces the pressure in the operating chamber to open the main valve when the electromagnetic operator is energized, and a servo regulated output.

Thus, from the above general description of the function of the invention, it can be seen that the mode and theory behind the operation of a device in accordance with the invention is the same as that in the prior art. What is believed to be novel is the particular means used to control the bleed system. In accordance with the present invention, the bleed system includes a single passageway leading from the inlet to a bleed chamber, a passageway leading from the bleed chamber to the operating chamber, and a passageway leading from the bleed chamber to a servo regulator which is connected to the outlet. Flow in the bleed system is controlled by an electromagnetic operator which operates an on-off bleed valve situated to control bleed flow to the servo regulator, and an orifice bleed valve situated to control bleed flow from the inlet to the bleed chamber. The orifice valve is situated in the single passageway leading from the inlet to the bleed chamber and allows full bleed flow in the open position and a restricted bleed flow in the clsoed position. Thus, when the electromagnet is deenergized, the on-off bleed valve will be closed and the orifice bleed valve open, allowing full bleed flow in the operating chamber to substantially equalize the pressure on both sides of the diaphragm and maintain the main valve in a closed position. However, upon energization, the electromagnetic operator opens the on-off bleed valve and closes the orifice bleed valve. Bleed gas is then bled away at a rate faster than can be supplied through the restricted orifice in the orifice bleed valve to decrease the pressure in the operating chamber and open the main valve.

In a second embodiment of the invention a second electromagnetic operator controls flow of bleed gas to a second servo regulator in parallel with the first servo regulator of the first embodiment. The first servo regulator may be set to regulate the outlet pressure at a low pressure and the second servo regulator may be set ot regulate the outlet pressure at a high pressure. Thus, since the second electromagnetic operator controls the flow of bleed gas to the second servo regulator a step opening can be effected if there is a time delay between energization of the two electromagnetic operators. This time delay may be provided, for instance, by a solid state time delay circuit connected to the thermostat circuit. In a modification, the two electromagnetic operators may be connected to a two stage high-low thermostat so that the first electromagnetic operator is energized when the contacts in the low stage close and the second electromagnetic operator is energized when the contacts in the high stage close.

It can be seen that the first embodiment of the invention provides a more low cost and easier to manufacture device than the device shown in U.S. Pat. No. 3,513,873 because the necessity for two bleed passages leading from the inlet to the bleed chamber is eliminated. The second embodiment of the invention provides an improvement over the device disclosed in U.S. Pat. No. 3,552,430 in that the present invention is more easily and precisely adjusted.

It is thus an object of the invention to decrease the cost of a single stage bleed controlled servo regulated gas valve without sacrificing desirable operating characterisics.

Another object of the invention is to provide an easily and precisely adjusted two stage bleed controlled servo regulated gas valve.

Other objects and advantages of the invention will become more evident from the following detailed discussion of the invention when taken in conjunction with the drawing, in which:

BRIEF DESCRIPTION OF THE DRAWINGS

FIG. 1 is a diagrammatic cross section of a single stage flow control device in accordance with the present invention;

FIG. 2 is an enlarged, detailed cross section of the orifice bleed valve of FIG. 1; and FIG. 3 is a diagrammatic cross section of a two stage flow control device in accordance with the present invention.

DESCRIPTION OF THE PREFERRED EMBODIMENT

Referring now to FIG. 1, there is shown, a flow control device in accordance with the present invention. The device may include a casing member 10 in which an inlet connecting portion 12 and an outlet connecting portion 14 are formed. In addition, the casing member 10 has an inlet chamber 16 and an outlet chamber 18 which are separated by a circular wall 20. The top end of the wall 20 opens to form a valve seat 22 against which a valve 24 may seat. The valve member 24 is rigidly attached to a main diaphragm 26, cup 28, back up plate 30, and a washer 32 by means of a rivet 34.

Main diaphragm 26 forms a gasket seal 36 between casing member 10 and a second casing member 38 inside which there is formed a control or operating chamber 40. When the two casing members 10 and 38 are secured together by screws or other suitable means, a compression spring 42 normally urges the valve member 24 against valve seat 22. The casing further includes a mounting plate 44 sandwiched between gaskets 46 and 48 and a cap member 50, all of which may be connected together by screws or other suitable means.

Bleed gas flows from the inlet chamber 16 by means of passageway 52 into a filter 54 which is held in place by the pressure of plate 44 against an O-ring 56. The filtered bleed gas then flows through an aperture 58 in plate 44 into upper bleed chamber 60 through aperture 62 in plate 44 and into lower bleed chamber 64. Lower bleed chamber 64 is connected to the operating chamber 40 by way of passageway 66.

An electromagnetic valve operating assembly is situated in a recess in casing member 38 and acts to operate two valves, an oriface bleed valve 68 and an on-off bleed valve 79, when energized through power lines 72 and 74 by the closing of thermostatically operated contacts 76 and 78. The electromagnetic valve operating assembly includes a core 80 fixedly attached to a casing wall in chamber 64 and an electromagnetic coil 82 wound thereon and connected by any suitable means to a source of electric potential through the thermostat. A frame member 84 forms a fulcrum for a pivotal armature member 86 which is attracted to the core member 80 whenever electromagnetic coil 82 is energized. The electromagnetic valve operating assembly may be fixed to casing member 38 by any suitable means such as by peening the end of core member 80 over and filling the recess with a suitable potting compound 88.

A compression spring 90 normally biases armature 86 so that it is rotated to its fullest extent in a clockwise direction as viewed in FIG. 1. Thus, whenever electromagnetic coil 82 is deenergized spring 90 will rotate armature 86 in a clockwise direction, exerting an upward force on a stem member 92 attached to orifice bleed valve member 68 and overcoming the bias which leaf spring 94 exerts in a downward direction on orifice bleed valve 68. In a similar manner, whenever electromagnetic coil 82 is deenergized and armature 86 is rotated to its full clockwise position, compression spring 96 will exert a downward force on valve stem member 98 to allow valve stem member 79 to engage valve seat 100. Valve member 98 further has an L-shaped operating portion 99 which extends upwardly from valve member 79 and which allows armature 86 to pull upwardly on stem 98 to open valve 79 when energized.

A passageway 102 allows bleed gas to flow through valve seat 100 to the inlet of a servo regulator 104. The outlet of servo regulator 104 is connected by means of passageway 106 to the outlet chamber 18 in the casing. The construction of the servo regulator is well known in the art and it should suffice to say that the regulator 104 includes a diaphragm 108 attached to which is a valve member 110 cooperating with valve seat 112, a compression spring 114 urging the valve member 110 closed, and a threaded plug member 116 to adjust the regulating pressure of the servo regulator 104.

Referring now to FIG. 2, there is shown a preferred assembly for the orifice bleed valve 68. As was stated earlier, the valving member of the orifice bleed valve may comprise an elongated stem portion 92 adapted for reciprocating movement within the opening 62 in plate 44. An integral collar 118 extends around the periphery of stem 92 and has a small orifice 120 therein. A washer-shaped member 122 made from a suitable valving material is attached by any suitable means, preferably adhesive means, to the underside of collar 118. At the bottom, the stem 92 sits in a detent 124 in armature 86. At the top, stem 92 is situated in a detent 126 in leaf spring 94.

The operation of the device depicted in FIGS. 1 and 2 will now be described. Assuming that thermostatically operated contacts 76 and 78 are open, electromagnetic coil 82 will be deenergized, armature 86, orifice bleed valve 68, and on-off bleed valve 79 will be in the position shown in FIG. 1. Thus, when heat is not called for by the thermostat, on-off bleed 79 will be seated against seat 100 preventing bleed flow through servo regulator 104 to the outlet chamber 18. Bleed gas will flow from the inlet chamber 16 through passageway 52, bleed filter 54, through apertures 58 and 62 in plate 44, into bleed chamber 64 and finally through passageway 66 into operating pressure chamber 40. It can thus be seen that diaphragm 26 will have substantially inlet pressure on both sides thereof, allowing compression spring 42 to bias valve member 24 closed, and preventing a flow of fuel from the inlet 12 to the outlet 14 whenever electromagnetic coil 82 is deenergized.

However as soon as the thermostatically operated contacts 76 and 78 close and call for heat, electromagnetic coil 82 will energize through power lines 72 and 74 attracting armature 86 to core 80 and pivoting it about the fulcrum on frame member 84. The armature will therefore pull upwardly against the bias of spring 96 on the operating portion 99 of on-off valve stem 98 to open valve 79. At the same time, the other end of armature 86 will move in a downward direction allowing leaf spring 94 to close orifice bleed valve 68 and allowing orifice 120 to register with opening 62 in plate 44. It can be seen that bleed gas will then be supplied to bleed chamber 64 through restricted orifice 120. Due to the fact that on-off bleed valve 79 is open, the bleed gas supplied through orifice 120 will be bled off through servo regulator 104 at a rate faster than can be supplied by the orifice 120, substantially reducing the pressure in operating chamber 40. The pressure in inlet chamber 16 now being substantially greater than that in operating chamber 40, allows diaphragm 26 to move against the bias of spring 42 to open valve 24. After that point the operation of the device is conventional and the servo regulator 104 will act to regulate the outlet pressure at a substantially constant value. Then, upon the opening of thermostatically operated contacts 76 and 78 and energization of electromagnetic coil 82, spring 90 will return armature 86 to its deenergized position opening orifice bleed valve 68 and allowing on-off bleed valve 79 to close. This supplies an unrestricted flow of bleed gas to the operating chamber 40 through passageway 52, filter 54, apertures 58 and 62, bleed chamber 64 and passageway 66 to equalize the pressure in operating chamber 40 and inlet chamber 16, thus rapidly closing valve member 24.

The device shown in schematic in FIG. 3 is in many respects the same as that shown in FIG. 1 with the exception that there are additional components added which allow step opening operation or two stage operation, whichever is desired. Therefore, the same reference numerals have been used to designate the same components and features in FIGS. 1 and 3.

Referring now to FIG. 3, the device includes another passageway 130 essentially connected to bleed chamber 64 through on-off bleed valve 79 and passageway 102 which leads to a second bleed chamber 132. Situated in second bleed chamber 132 is a second electromagnetic valve operating assembly including electromagnetic coil 134 wound on core member 136 and a frame member 138 which forms a fulcrum for armature 140, normally biased to a clockwise position by compression spring 142. The electromagnetic coil 134 is energized through lines 144 and 146 which are controlled by time delay 140. The time delay may be any time delay which provides the needed time delay between steps in a step opening operation. A solid state time delay is preferred, however, and is connected to the power source through lines 146 and 150. It can thus be seen that whenever thermostatically operator contacts 76 and 78 close, electromagnetic coil 134 will be energized a predetermined time interval after electromagnetic coil 82 is energized.

Electromagnetic armature 140 acts to operate a valve member 152 which is biased to a normally open position by spring 154. Valve member 152 when in the open position allows bleed gas to flow from bleed chamber 132 through another passageway 156 to a second servo regulator 158 which is connected to the outlet 14 by means of passageway 160. Servo regulator 158 is substantially the same as servo regulator 104 with the exception that it is set to regulate a higher pressure than regulator 104 and includes a diaphragm member 160, a valve member 162 connected thereto, a valve seat 164, a spring 166, and a threaded plug member 168 to adjust the pressure regulating level. It can be seen that whenever electromagnetic coil 134 is energized, attracting armature 140 to core member 136 and valve member 152 is open, servo regulators 104 and 158 are effectively placed in parallel due to the fact both are connected to the outlet and passageway 102.

In operation, the device shown in FIG. 3 operates in the same manner as the device shown in FIG. 1 until the second electromagnetic operator 134 is energized. Thus, when thermostatically operated contacts 76 and 78 close, electromagnet 82 will be energized to open on-off bleed valve 79 and close orifice bleed valve 68. At the same time, time delay circuit 148 will be energized. Opening of on-off bleed valve 79 and closing or orifice bleed valve 68 has the same effect as in FIG. 1 and reduces the pressure in operating chamber 40 to allow main valve 24 to open. During this time, the pressure in outlet chamber 15 is regulated at a first level by pressure regulator 104.

After a predetermined time interval, determined by time delay 148, the second electromagnetic coil 134 will be energized, attracting armature 140 to core 136 and allowing valve 152 to open. The opening of valve 152 places servo regulators 104 and 158 in parallel. Since servo regulator 158 is set to regulate a higher pressure, bleed gas will be bled off from operating chamber 40 at a higher rate than servo regulator 104 to further reduce the pressure in operating chamber 40 and allow the main valve 24 to open a further step. After that point, servo regulator 158 is dominant and regulates the outlet pressure according to its adjusted rate. When the thermostat is satisfied and contacts 76 and 78 open main valve 24 will close rapidly due to the fact that orifice bleed valve 68 will be open, allowing gas to flow from the inlet through passageway 66 and into operating chamber 40 in an unrestricted manner.

It is contemplated that modifications can be made without departing from the true scope of the present invention. For example, the embodiment shown in FIG. 3 can be easily modified to provide, rather than step-opening operation, two stage operation simply by utilizing a high-low thermostat and connecting the low thermostat contacts to electromagnetic coil 82 and the high thermostat contacts to electromagnetic coil 134. With such a modification, the control device would then provide a low degree of heat whenever the low thermostat contacts are closed and a high degree of heat whenever both the low and high thermostat contacts are closed.

Other modifications should be obvious to those skilled in the art and it is intended that the above discussion is for illustrative purposes only and that the scope of the invention be defined in the following claims.

What is claimed is:

1. A control device for controlling the flow of fuel to a gas burner, comprising:
   a casing having inlet and outlet means;
   main valve means for controlling the flow of fuel between said inlet and outlet means;
   a diaphragm operably connected to said main valve means, said diaphragm defining an operating pressure chamber between a wall on said casing and said diaphragm, and being responsive to a pressure differential on both sides thereof to operate said main valve means;

a first bleed flow path connecting said inlet means with said outlet means;

a second bleed flow path connecting said first bleed flow path with said operating chamber;

an orifice bleed valve disposed in said first bleed flow path upstream from said second bleed flow path;

said orifice bleed valve comprising a valve member disposed for open and closed relationship with a corresponding valve seat, said valve member having a restricted orifice extending therethrough, said restricted orifice being disposed for registry with an opening through said valve seat so that the flow of bleed gas is restricted when said valve member is closed; and unrestricted when said valve member is open;

an on-off bleed valve disposed in said first bleed flow path downstream from said second bleed flow path;

means for normally biasing said on-off bleed valve to a normally closed position;

means for normally biasing said orifice bleed valve to an open position; and automatic means for closing said orifice bleed valve and opening said on-off bleed valve whereby bleed gas is bled off from said operating pressure chamber at a rate higher than can be supplied through said restricted orifice to reduce the pressure therein and move said diaphragm to operate said main valve means.

2. The control device as claimed in claim 1, wherein said automatic means comprises an electromagnetic valve operator energized by closure of a first thermostat connecting said electromagnetic valve operator to a source of power.

3. The control device as claimed in claim 1, wherein a servo regulator is disposed in said first bleed flowpath downstream from said on-off bleed valve.

4. The control device as claimed in claim 3, further comprising:
a third bleed flow path connected to said first bleed flow path intermediate said on-off bleed valve and said servo regulator and connected to said outlet means;
a second on-off valve disposed in said third bleed flow path;
means for opening said second on-off valve; and
a second servo regulator disposed in said third bleed flow path downstream from said second on-off valve, said second servo regulator being adjusted to regulate the outlet pressure at a higher pressure than said first servo regulator.

5. The control device as claimed in claim 4 wherein said means for opening said second on-off valve comprises a second electromagnetic valve operator.

6. The control device as claimed in claim 5, wherein said second electromagnetic valve operator is energized by closure of a second set of thermostat contacts.

7. The control device as claimed in claim 5, wherein the energization of said second electromagnetic valve operator is controlled by a time delay which energizes said second electromagnetic valve operator a predetermined time interval after said first electromagnetic valve operator is energized.

8. A control device for controlling the flow of fuel to a gas burner, comprising:

a casing having inlet and outlet means;

main valve means for controlling the flow of fuel between said inlet and outlet means;

a diaphragm operably connected to said main valve means, said diaphragm defining an operating pressure chamber between a wall on said casing and said diaphragm, and being responsive to a pressure differential on both sides thereof to operate said main valve means;

a first bleed flow path connecting said inlet with said outlet; a second bleed flow path connecting said first bleed flow path with said operating pressure chamber;

a first electrically operated valve located in said first bleed flow path downstream from the junction of said first and second bleed flow paths;

a first servo regulator located in said first bleed flow path downstream from the junction of said first and second bleed flow paths;

a second servo regulator connected in parallel with said first servo regulator and being adjusted to regulate the pressure in said outlet at a higher pressure than said first servo regulator;

a second electrically operated valve controlling the flow of bleed gas to said second servo regulator; and means for energizing said first and second electrically operated valves.

9. The device as claimed in claim 8, wherein said first and second electrically operated valves are energized sequentially.

10. The device as claimed in claim 9, wherein the energization of said first electrically operated valve is controlled by a thermostat and the energization of said second electrically operated valve is controlled by a time delay.

11. The device as claimed in claim 8, wherein the energization of said first and second electrically operated valves is controlled by a two stage thermostat.

12. The device as claimed is claim 8, wherein one of said first and second electrically operated valves in an electromagnetically operated valve.

13. The device as claimed in claim 1, wherein said first bleed flow path is the only bleed flow path connected to said inlet means.

14. The device as claimed in claim 1, wherein said automatic means simultaneously closes said orifice bleed valve and opens said on-off bleed valve.

15. A control device for controlling the flow of fuel to a gas burner, comprising:

a casing having inlet and outlet means;

main valve means for controlling the flow of fuel between said inlet and outlet means;

a diaphragm operably connected to said main valve means, said diaphragm defining an operating pressure chamber between a wall on said casing and said diaphragm, said diaphragm being responsive to a pressure differential on both sides thereof to operate said main valve means;

a single bleed passageway connected to said inlet means;

a first bleed flow path connecting said single bleed passageway with said outlet means;

a second bleed flow path connecting said first bleed flow path with said operating chamber;

an orifice bleed valve disposed in said first bleed flow path upstream from said second bleed flow path;

said orifice bleed valve comprising a valve member disposed for open and closed relationship with a corresponding valve seat, said valve member having a restricted orifice extending therethrough, said orifice being disposed for registry with an opening through valve seat so that the flow of bleed gas is restricted when said valve member is closed;

an on-off bleed valve disposed in said first bleed flow path downstream from said second bleed flow path;

means for normally biasing said on-off bleed valve to a normally closed position; and automatic means for simultaneously closing said orifice bleed valve and opening said on-off bleed valve whereby bleed gas is bled off from said operating pressure chamber to reduce the pressure therein and move said diaphragm to operate said main valve means.

16. A control device for controlling the flow of fuel to a gas burner, comprising:

a casing having inlet and outlet means;

main valve means for controlling the flow of fuel between said inlet and outlet means;

a diaphragm operably connected to said main valve means, said diaphragm defining an operating pressure chamber between a wall on said casing and said diaphragm, and being responsive to a pressure differential on both sides thereof to operate said main valve means;

a first bleed flow path connecting said inlet means with said outlet means;

a second bleed flow path connecting said first bleed flow path with said operating chamber;

an orifice bleed valve disposed in said first bleed flow path upstream from said second bleed flow path;

said orifice bleed valve comprising a valve member disposed for open and closed relationship with a corresponding valve seat, said valve member having a restricted orifice extending therethrough, said orifice being disposed for registry with an opening through said valve seat so that the flow of bleed gas is restricted when said valve member is closed;

an on-off bleed valve disposed in said first bleed flow path downstream from said second bleed flow path;

means for normally biasing said on-off bleed valve to a normally closed position;

leaf spring means for urging said orifice bleed valve to the closed position; and an electrically operated valve operator movable between energized and deenergized positions, said valve operator urging said orifice bleed valve to the open position and allowing said on-off bleed valve to be biased to the normally closed position when deenergized, said valve operator allowing said leaf spring means to urge said orifice bleed valve to the closed position and opening said on-off bleed valve when energized.

* * * * *